(12) United States Patent  (10) Patent No.: US 8,520,115 B2
Urakawa (45) Date of Patent: Aug. 27, 2013

(54) IMAGE PROCESSING APPARATUS AND METHOD FOR DISPLAYING AN IMAGE TO AN OBSERVER

(75) Inventor: Takashi Urakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 726 days.

(21) Appl. No.: 12/689,533

(22) Filed: Jan. 19, 2010

(65) Prior Publication Data

US 2010/0182479 A1 Jul. 22, 2010

(30) Foreign Application Priority Data

Jan. 21, 2009 (JP) ................................ 2009-010991

(51) Int. Cl.
*H04N 5/222* (2006.01)
(52) U.S. Cl.
USPC ............ 348/333.02; 348/333.03; 348/333.04; 396/148
(58) Field of Classification Search
USPC ............ 348/333.02, 333.05, 333.03, 333.04; 396/148
See application file for complete search history.

(56) References Cited

U.S. PATENT DOCUMENTS

2006/0153557 A1 * 7/2006 Hirai ........................... 396/150

FOREIGN PATENT DOCUMENTS

| CN | 1567390 A | | 1/2005 |
|---|---|---|---|
| DE | 102005026952 A1 | * | 12/2005 |
| JP | 8-223468 A | | 8/1996 |
| JP | 11-174986 A | | 7/1999 |
| JP | 2004064131 A | * | 2/2004 |
| JP | 2008-074139 A | | 4/2008 |

\* cited by examiner

*Primary Examiner* — Antoinette Spinks
(74) *Attorney, Agent, or Firm* — Canon U.S.A., Inc. IP Division

(57) ABSTRACT

An apparatus includes a setting unit configured to set a blind spot area based on a blind spot position of an observer within a display area for displaying an image to the observer, and a notification unit configured to notify, when displaying within the blind spot area is changed due to a change of an observation environment observed by the observer, the observer of the change within the blind spot area.

16 Claims, 13 Drawing Sheets

IMAGE PROCESSING APPARATUS AND METHOD FOR DISPLAYING AN IMAGE TO AN OBSERVER

BACKGROUND OF THE INVENTION

1. Field of the Invention

The present invention relates to an image processing apparatus and an image processing method for displaying an image to an observer.

2. Description of the Related Art

In a display device referred to as Micro Display such as a compact liquid crystal panel or an organic electroluminescence (EL) display, an apparatus that allows the observer to observe a virtual image by using a magnification optical system has been developed. This apparatus is used for an electronic viewfinder (EVF) that checks a frame taken by a video camera or a digital camera, or enables focus adjustment.

In recent years, in order to perform focus adjustment with the electronic viewfinder in an image pickup device at higher resolution, higher definition of the display device has been developed for the electronic viewfinder. Since the display device has become smaller in size and higher in definition, a good quality image can be provided even when a magnification rate is increased and the observer wants to observe a large image. In addition, an angle of view of an image observed by the electronic viewfinder tends to be larger.

In an apparatus such as an electronic viewfinder that displays an observed image, if an angle of view of the observed image is large, a certain area of the observed image may form an image in a blind spot position of the observer, generating an area unrecognizable by the observer in the observed image. For example, in a conventional electronic viewfinder, an angle of view of one eye is about 12°, and hence a blind spot located at about 15° causes no issue. However, a blind spot may become an issue in an electronic viewfinder that has an angle of view larger than 15°.

Especially, in a viewfinder of the video camera or the digital camera, if an intrusive object enters an area corresponding to the blind spot after the observer has determined a frame to be taken, the observer loses the intrusive object. As a result, an image unintended by the observer may be captured.

As a conventional technology that takes a line of sight of the observer into account, Japanese Patent Application Laid-Open No. 08-223468 discuses a technology for detecting a line-of sight direction of the observer, and changing a capturing range according to the line-of sight direction of the observer. However, in the technology discussed in Japanese Patent Application Laid-Open No. 08-223468, when an image of a large angle of view is observed, there is a possibility that the observer may lose an intrusive object displayed in a position corresponding to the blind spot.

As a conventional technology that takes the blind spot of the observer into account, Japanese Patent Application Laid-Open No. 11-174986 discuses a technology for displaying a low-quality portion of an image in the position corresponding to the blind spot of the observer. However, in the technology discussed in Japanese Patent Application Laid-Open No. 11-174986, while the image observed by the observer is changed based on the blind spot of the observer, an oversight caused by the blind spot of the observer cannot be prevented.

SUMMARY OF THE INVENTION

According to an aspect of the present invention, an apparatus includes a setting unit configured to set a blind spot area based on a blind spot position of an observer within a display area for displaying an image to the observer, and a notification unit configured to notify, when displaying within the blind spot area is changed due to a change of an observation target observed by the observer, the observer of the change within the blind spot area.

Further features and aspects of the present invention will become apparent from the following detailed description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
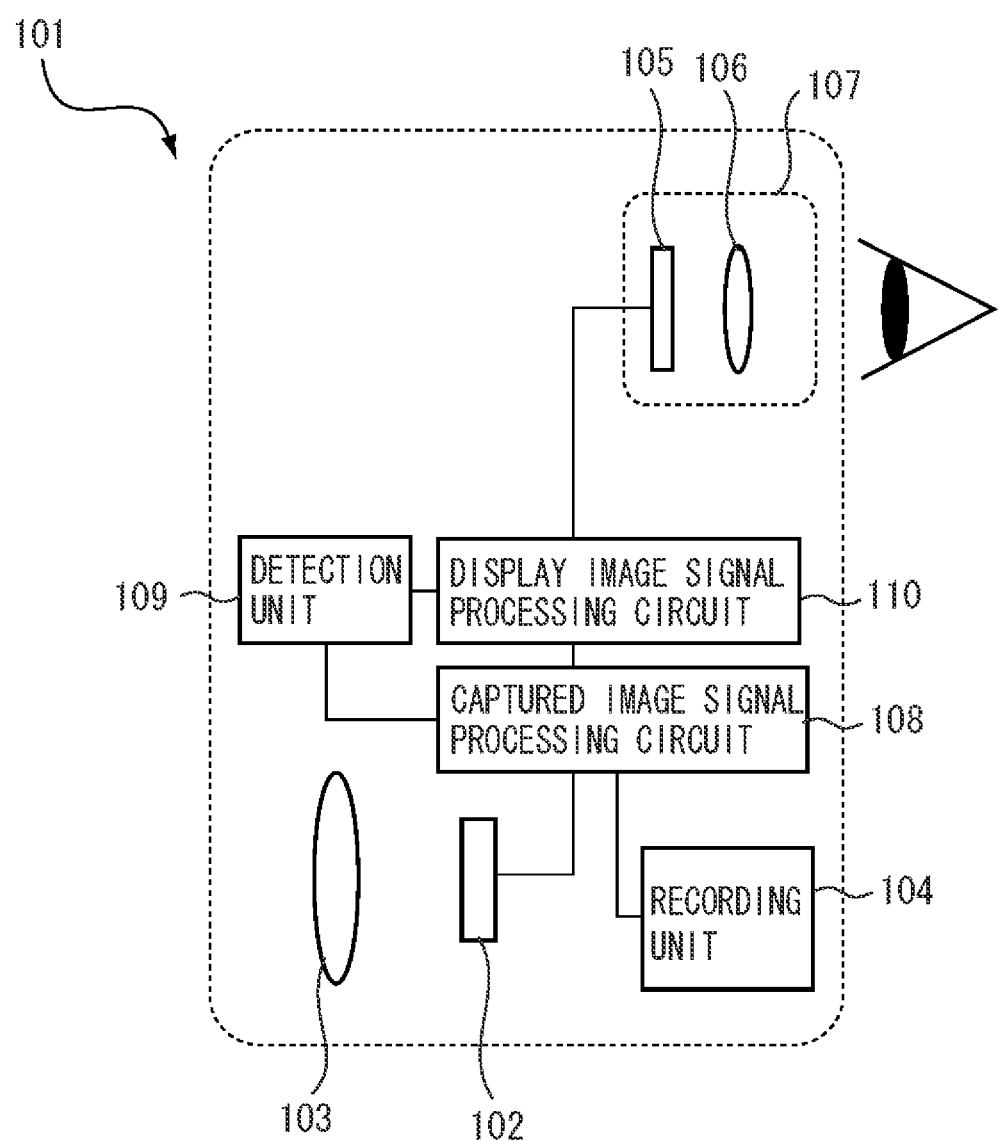
FIG. 1 illustrates a configuration of an image processing apparatus according to a first exemplary embodiment.

FIG. 1 illustrates a configuration of an image processing apparatus 101 according to a first exemplary embodiment. Hereinafter, referring to FIG. 1, each component of the image processing apparatus 101 will be described.

An image pickup device 102 includes a charge coupled device (CCD) or a complementary metal oxide semiconductor (CMOS). An image formed on the image pickup device 102 is obtained as digital image data. The number of pixels of the image pickup device 102 can be optionally selected. The presence of about 2.07 million pixels consisting of 1920 pixels in a horizontal direction and 1080 pixels in a vertical direction enables capturing of a high-definition image. However, an image pickup device with higher definition than the number of pixels of a high-definition type, or an image pickup device with lower resolution may also be selected.

An imaging lens 103 is configured to form an image of an object on the image pickup device 102. In FIG. 1, the imaging lens 103 has a zoom mechanism (not illustrated) that enables a user to optionally change a magnification rate of the object image formed on the image pickup device 102 based on an instruction from an observer.

(Recording unit 104) The recording unit 104 of the exemplary embodiment includes a hard disk or a semiconductor memory, and records digital image data obtained by the image pickup device 102. Digital image data to be stored may be data image-processed by other processing units.

(Display unit 105) The display unit 105 has a display area, and includes a cathode ray tube (CRT), a liquid crystal display (LCD), or an organic light emitting diode (OLE). However, a display unit that scans a point light source by a compact mirror that uses a micro electro mechanical system (MEMS) recently put to practical use to form a two-dimensional image, or a display unit based on a digital micro-mirror device (DMD) may also be used. The display unit 105 can display the obtained digital image data to the observer. In order to display a high-definition image, as with the image pickup device 102, 1920 pixels in a horizontal direction and 1080 pixels in a vertical direction are used.

In this exemplary embodiment, the display unit 105 includes a digital display device in its lower position to display alphabets and numerals. The location of the digital display device is not limited to the lower position of the display unit 105, but may be disposed in its upper position or a left/right side. In order to enable displaying of information other than a captured image, a display unit 105 that has more pixels than resolution of an image pickup device 102 of 1920 pixels in a horizontal direction and 1200 pixels in a vertical direction, may be used and the digital display device can be omitted. Alphabets and numerals displayed by the digital display device will be described below in detail.

An eyepiece lens 106 is configured to facilitate observation of an image displayed by the display unit 105 for the observer. Various configurations have been already offered for the eyepiece lens, and thus detailed description thereof will be omitted.

A viewfinder unit 107 includes the display unit 105 and the eyepiece lens 106 that is an optical member of the viewfinder unit 107. The observer observes an image presented by the display unit 105 through the eyepiece lens 106 of the viewfinder unit 107. Generally, a human eye whose vision is 1.0 has resolution of 1'. When the number of pixels in a horizontal direction of the display unit 105 is 1920, a horizontal angle of view of the viewfinder unit 107 is set to 32° so that one pixel can have resolution of 1' at a visual angle of the observer. In this exemplary embodiment, an aspect ratio of an observed image of the viewfinder unit 107 is set to 16:9 which is a standard of digital broadcasting. Thus, an angle of view in a vertical direction is 18°.

A captured image signal processing circuit 108 includes a central processing unit (CPU) and a random access memory (RAM) for storing an image processing program. The captured image signal processing circuit 108 performs image processing for digital image data obtained by the image pickup device 102.

(Detection Unit 109) The detection unit 109 of this exemplary embodiment includes a CPU and a RAM for storing a detection processing program.

The detection unit 109 performs detection processing for detecting a predetermined area from the digital image data processed by the captured image signal processing circuit.

A display image signal processing circuit 110 includes a CPU and a RAM for storing an image processing program. The display image signal processing circuit 110 performs image processing on the digital image data that has been subjected to the image processing by the captured image signal processing circuit 108 to display an image on the display unit 105.

Next, a blind spot of the human eye will be described.

Figure 2:
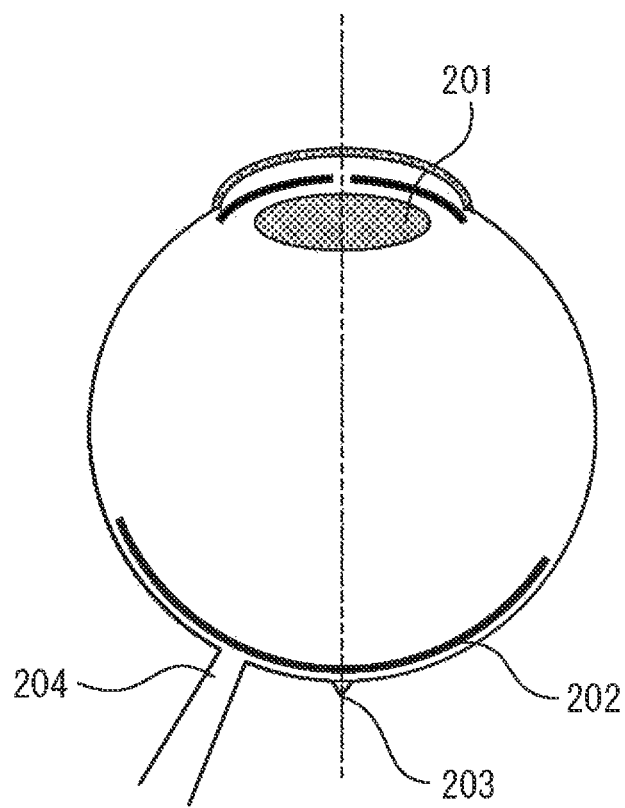
FIG. 2 illustrates a horizontal section of a human right eye.

FIG. 2 illustrates a horizontal section of a human right eye. When observing an object, a person performs focus adjustment by a crystalline lens 201 to form an image of the object on a retina 202. In the drawing, for easier understanding, a space is provided between the retina 202 and an inner wall surface of an eyeball. In reality, however, the retina 202 is present just on the inner wall surface of the eyeball. A position of the human eye having highest resolution is a place referred to as a fovea centralis 203 on the retina. Thus, a portion to be closely observed by the person forms an image on the fovea centralis 203.

An image-forming position on the retina 202 is formed in a direction opposed to that of a position of a currently observed object. Thus, in an eyeball structure of FIG. 2, there is a bundle of nerves referred to as a blind spot 204 on a body center side from the fovea centralis 203, in other words, within a range of about 13° to 18° from an image center in a right horizontal direction that is an ear side direction and 2° upward and 4° downward respectively from the image center in a vertical direction. The blind spot 204 includes no visual cell, and hence the person cannot observe an image formed on the blind spot 204.

Next, a method for detecting a range corresponding to the blind spot of the observer by the detection unit 109 based on the image will be described.

Figure 3:
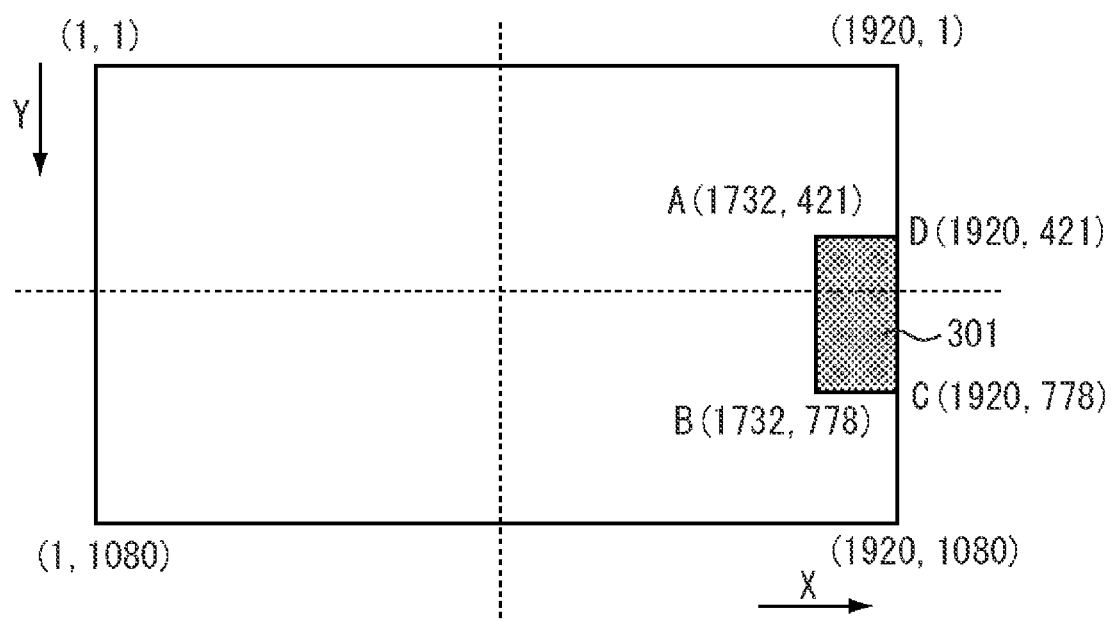
FIG. 3 illustrates a positional relationship between an image configuration and a blind spot of an observer on a display surface of a display unit.

FIG. 3 illustrates a positional relationship between an image configuration on the display surface of the display unit 105 and the blind spot 204 of the observer. The display unit 105 illustrated in FIG. 3 has 1920 pixels in the horizontal direction and 1080 pixels in the vertical direction. Thus, as illustrated in FIG. 3, the horizontal direction of the display unit 105 is set as an X direction, the vertical direction is set as a Y direction, pixels of a left upper corner are set as (1, 1), and pixels of a right lower corner are set as (1920, 1080). When an object that is an observation target of the observer is located on the center of the display surface, the observer closely observes the center of the display surface, and an image of the center of the display surface is formed in the fovea centralis 203 on the retina 202.

In this exemplary embodiment, a horizontal angle of view from a left end to a right end of the viewfinder 107 is 32°, and hence an angle of view is set to 16° in a right half of a screen from the center of the image. The blind spot 204 is located 13° to 18° to the horizontal right side from the image center and hence, on the display surface of the viewfinder 107, the blind spot 204 is from a position of horizontal right side 13° to the right end of the display surface. A position on the display surface (position of the horizontal right side 13° from the center of the display surface) corresponding to the blind spot 204 can be calculated by the following expression (1):

$$\frac{\tan 13}{\tan 16} \times 960 + 960 = 1732 \qquad (1)$$

Therefore, the blind spot 204 is a 1732-th pixel in FIG. 3.

In the vertical direction, the blind spot 204 is located 2° upward and 4° downward. Thus, when similar calculation is performed, in a corresponding image position, a pixel within a range surrounded by four points of A (1732, 421), B (1732, 778), C (1920, 778), and D (1920, 421) becomes a blind spot range 301 of the observer (blind spot area made invisible due to the blind spot position of the observer). The observer cannot recognize a change of the image in the blind spot range 301.

Figure 4:
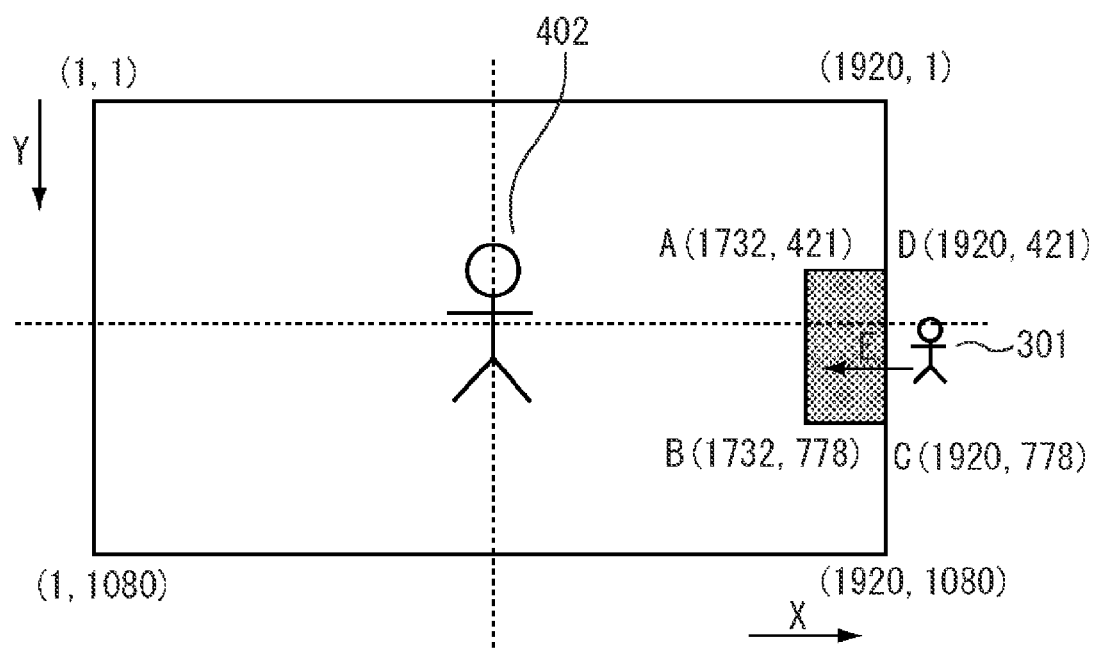
FIG. 4 illustrates the intrusion of an object within a blind spot range.

FIG. 4 illustrates an object entering the blind spot range 301. In FIG. 4, the observer sets an object 401 in the center of a captured frame to capture the object by the image processing apparatus 101. In this state, when the observer closely observes the object 401, the observer cannot recognize a change of an image in the blind spot range 301. Hence, if an object 402 advances from the outside of a currently captured frame in an arrow direction E in FIG. 4 to appear in the captured frame, the observer cannot notice the appearance of the object 402 in the blind spot range 301. If the object 402 appears in the captured frame while the observer is unaware of the object, an image unintended by the observer is captured.

In this exemplary embodiment, an image signal from the image pickup device 102 corresponding to the blind spot range 301 of the observer is transmitted from the captured image signal processing circuit 108 to the detection unit 109. The detection unit 109 calculates a difference between images for each frame frequency of the image pickup device 102 of the exemplary embodiment. If there is no difference (or difference is equal to or less than a predetermined value) between image signals in the blind spot range 301 before and after a change, no object 402 appears within the blind spot range 301 in the frame. On the other hand, if there is a difference between image signals in the blind spot range 301, the object 402 appears in the blind spot range 301. After detection of the appearance of the object 402 in the blind spot range 301 through the above processing, the detection unit 109 transmits a signal indicating the detection of the object 402 to the object display image processing circuit 110.

After reception of the signal indicating the detection of the object 402 from the detection unit 109, the display image signal processing circuit 110 superimposes an image signal for warning such as "blind spot range warning" in a right lower portion of the image on the display unit 105, which is transmitted to the display unit 105.

Thus, when the object 402 appears in the blind spot range 301 while the observer closely observes the center of the display surface, the observer can recognize the appearance of the object 402 in the blind spot range 301 only by observing the image of the viewfinder unit 107.

The portion for displaying warning is not limited to the right lower side. Any portion outside the blind spot range 301 may be used. The warning may not be displayed in the image of the display unit 105. Instead, the digital display device may only display a simple mark. A warning message is not limited to the above. Any message such as "blind spot range check" that notifies of a possibility of the appearance of the object 402 unintended by the observer in the frame can be used. In place of displaying a warning message, a notification making voice announcement or applying vibrations to the observer without interfering with capturing may be used.

In this exemplary embodiment, the image signal of the blind spot range 301 transmitted from the image pickup device 102 to the detection unit 109 is set within the range surrounded with the points A to D. However, a blind spot range 301 varies from an individual to an individual, and hence a blind spot range 301 slightly differs from one observer to another. Thus, in order to correct such an individual difference, a marker may be used to perform correction.

A method for correcting an individual difference will be described below. First, in a state where the observer observes the center of the display surface of the viewfinder unit 107, the display unit 105 displays a marker. While moving the marker in this state, a portion where the marker cannot be observed in the state where the observer closely observes the center of the display surface is specified. Calibration for determining an image signal of the image pickup device 102 to be transmitted to the detection unit 109 may also be performed. In this way, the blind spot range 301 corresponding to the individual difference between the observers can be detected.

This exemplary embodiment has been described by way of example where the observer observes the image of the viewfinder 107 by the right eye. In the case of observation by a left eye, the blind spot range 301 of the observer is symmetrical to the horizontal center of the image.

Thus, in the case of observing the image of the viewfinder 107 by the left eye, on coordinates illustrated in FIG. 3, a range of transmission to the detection unit 109 is a range surrounded with a point A' (0, 421), a point B' (0, 778), a point C' (188, 778) and a point D' (188, and 421). Whether the right eye or the left eye of the observer is used can be switched by operating a switch (not illustrated). Since the detection range of transmission from the captured image signal processing circuit 108 to the detection unit 109 is switched by operating the switch, the apparatus can deal with both the right eye and the left eye of the observer.

Alternatively, whether the right eye or the left eye of the observer is used may be determined based on a mounting direction of the viewfinder unit 107. In this case, based on the mounting direction of the viewfinder unit 107, a detection range of transmission from the captured image signal processing circuit 108 to the detection unit 109 may be automatically determined.

When capturing the object, there is a case that appearance of the object 402 in the frame is not cared. In such a case, notification of each appearance of the object 402 in the blind spot range 301 of the observer may be burdensome for the observer.

Thus, in this exemplary embodiment, a switch for object detection that starts and stops the notification unit is disposed in the image processing apparatus 101. In the exemplary embodiment, the function of the notification unit may be operated only during recording of a moving image by the image processing apparatus 101.

When the image processing apparatus 101 performs a panning or tilting operation while capturing an image, the detection unit 109 erroneously detects appearance of an object due to a difference generated between image signals within a detection range. During the panning or tilting operation, entire image signals being captured is changing. Thus, the image processing apparatus 101 is provided with a function for determining whether a panning or tilting operation is performed in the captured image signal processing circuit 108, judging by all the image signals, and determining whether to transmit the image signals to the detection unit 109. Similarly, when the image processing apparatus 101 moves the imaging lens 103 to perform zooming while capturing an image, the detection unit 109 detects an appearance of an object due to a difference generated between image signals within the detection range. Thus, in the case of the panning or tilting operation, during the zooming, whether to transmit the signals of the detection range from the captured image signal processing circuit 108 to the detection unit 109 is determined from all the captured images.

As another method, no signal may be transmitted from the captured image signal processing circuit 108 to the detection unit 109 while the imaging lens 103 is moved. This method can prevent erroneous detection by the detection unit 109.

Next, a specific processing flow for detecting an object in the blind spot range in this exemplary embodiment will be described.

Figure 5:
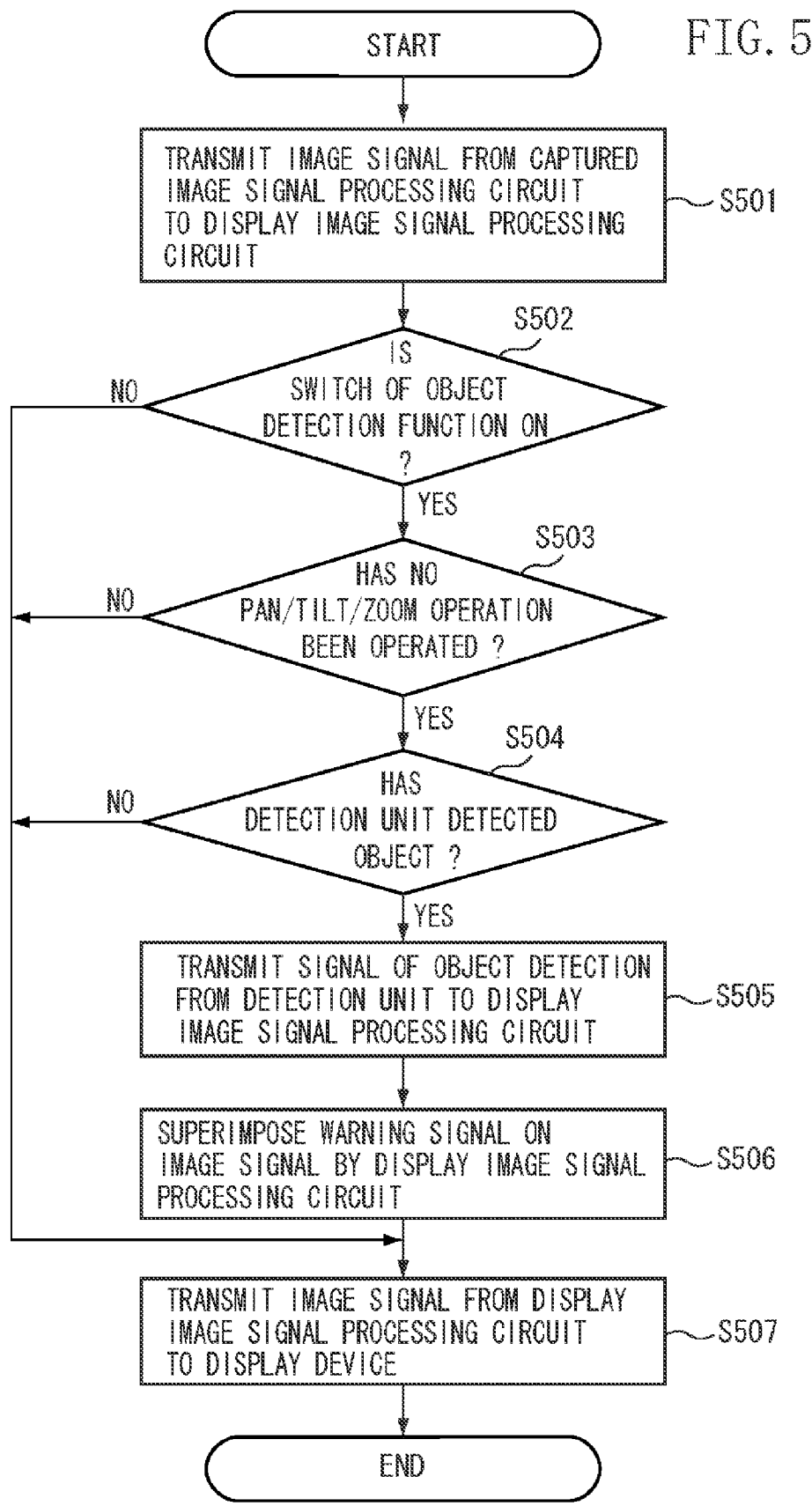
FIG. 5 illustrates a specific processing flow of detection and notification of the object within the blind spot range according to the first exemplary embodiment.

FIG. 5 illustrates a specific processing flow for detecting and notifying of an object in the blind spot range according to this exemplary embodiment. Processing steps in FIG. 5 are performed by the captured image signal processing circuit 108, the detection unit 109, and the display image signal processing circuit 110 included in the image processing apparatus 101, respectively.

In step S501, the captured image signal processing circuit 108 obtains digital image data from the image pickup device 102, generates an image by performing predetermined image processing, and then transmits an image signal to the display image signal processing circuit 110. The image processing in this case includes detection and setting of the blind spot range 301 in the image signal.

In step S502, the detection unit 109 determines whether the switch of the object detection function is ON. If the switch of the object detection function is ON (YES in step S502), the processing proceeds to step S503. If not ON (NO in step S502), the processing proceeds to step S507.

In step S503, the captured image signal processing circuit 108 functions as an orientation detection unit, which determines whether the observer is performing panning/tilting/zooming operation. If it is determined that the observer is performing panning/tilting/zooming operation (YES in step S503), the processing proceeds to step S504. On the other hand, if it is not determined that the observer is performing panning/titling/zooming operation (NO in step S503), the processing proceeds to step S507. The captured image signal processing circuit 108 transmits the image signal to the detection unit 109.

In step S504, the detection unit 109 detects a change of the image in the blind spot range 301 of the received image signal. The detection of the change of the image enables detection of the intrusion of an object in the blind spot area in the display area. When the detection unit 109 detects the change of the image, the processing proceeds to step S505. When the detection unit 109 detects no change of the image, the processing proceeds to step S507.

In step S505, the detection unit 109 transmits a signal indicating the detection of the object to the display image signal processing circuit 110.

In step S506, the display image signal processing circuit 108 superimposes a warning message on the received image signal to generate an image signal having the warning message superimposed thereon.

In step S507, the display image signal processing circuit 108 causes the display unit 105 to display the image. When the detection unit 109 detects the object in the blind spot range 301, the displayed image has a warning message superimposed thereon. When the detection unit 109 detects no object, no warning message is superimposed on the displayed image.

The specific processing flow for detecting and notifying of the object in the blind spot range according to this exemplary embodiment is as described above. Each of the steps can be performed by a general personal computer that stores a computer program for performing predetermined processing.

As descried above, even when the observer sets the object 401 to be captured in the image center to closely observe the object, the observer can be notified of the appearance of the object 402 in the blind spot range 301 of the observer. Thus, the observer can know the appearance of the unintended object 402 in the captured frame . As a result, the observer can prevent capturing of the unintended image by changing a frame to be taken or canceling an image pick-up operation.

A method for preventing the capturing of the unintended image by the observer will be described when the detection unit 109 detects the appearance of the object 402, however, the observer continues capturing the image. When the detection unit 109 detects the appearance of the object 402, and the captured image signal processing circuit 108 transmits an image signal to the recording unit 104, the captured image signal processing circuit 108 transmits a signal obtained by replacing an image before the appearance of the object 402 in the blind spot range 301 with an image after the appearance. By this method, an image recorded in the image processing apparatus 101 can be made an image where no object 402 appears, thereby preventing the observer from capturing the unintended image.

In this exemplary embodiment, the image displayed by the display unit 105 is an image of a real space captured by the image pickup device 102. The image processing apparatus can also be applied to, for example, a case of displaying an image of a virtual space by using computer graphics.

Figure 6:
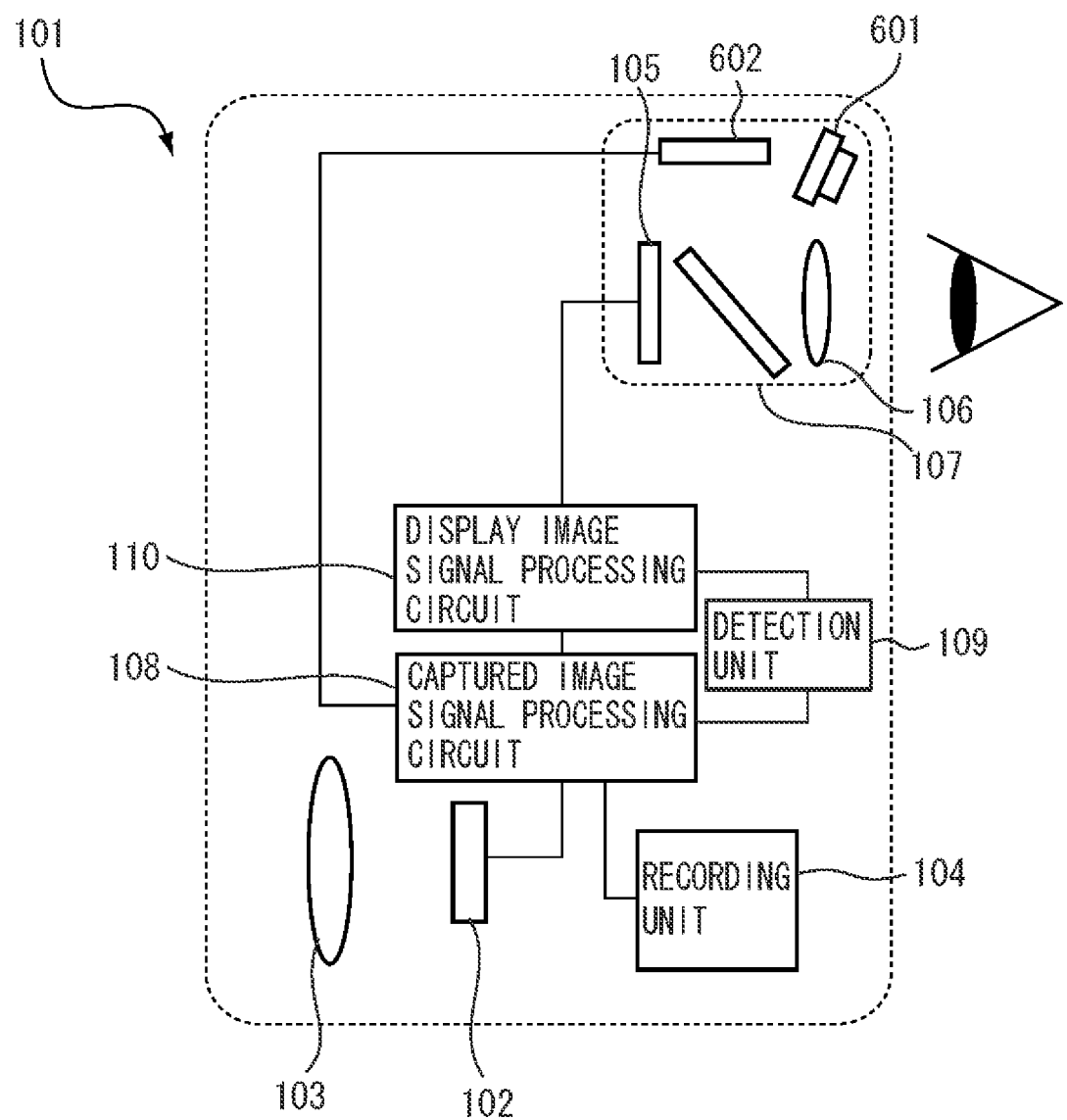
FIG. 6 illustrates a configuration of an image processing apparatus according to a second exemplary embodiment.

FIG. 6 illustrates a configuration of an image processing apparatus 101 according to a second exemplary embodiment.

The configuration of the image processing apparatus 101 of this exemplary embodiment is almost similar to that of the first exemplary embodiment, and members similar to those of the first exemplary embodiments have similar reference numerals. A difference of this exemplary embodiment from the first exemplary embodiment is that a viewfinder unit 107 includes an illumination unit 601 for illuminating an eyeball of an observer and a line-of sight detection unit 602 for detecting a line-of sight direction of the observer. In this exemplary embodiment, the observer observes an image of the viewfinder unit 107 by the right eye.

The illumination unit 601 includes a light emission unit such as a general light emitting diode (LED) to illuminate the eyeball of the observer.

The line-of sight detection unit 602 performs line-of sight direction detection, and includes a general charge coupled device (CCD) image sensor to detect a line-of sight direction of the observer. Data of the detected line-of sight direction of the observer is transmitted to a captured image signal processing circuit 108 and a detection unit 109.

The line-of sight detection unit 602 may be configured to detect the line-of sight direction of the observer from a luminescent spot of an eyeball surface of the observer illuminated by the illumination unit 601, i.e., Purkinje image. Other methods may be used as long as the methods can detect the line-of sight direction of the observer.

A specific processing flow for detecting and notifying an object in a blind spot range according to this exemplary embodiment is almost similar to that of the first exemplary embodiment. A difference from the first exemplary embodiment is that the detection unit 109 takes the line-of sight direction of the observer into account when detecting the object in the blind spot range.

Hereinafter, processing where the detection unit 109 takes the line-of sight direction of the observer into account when detecting the object in the blind spot range will be described.

Figure 7:
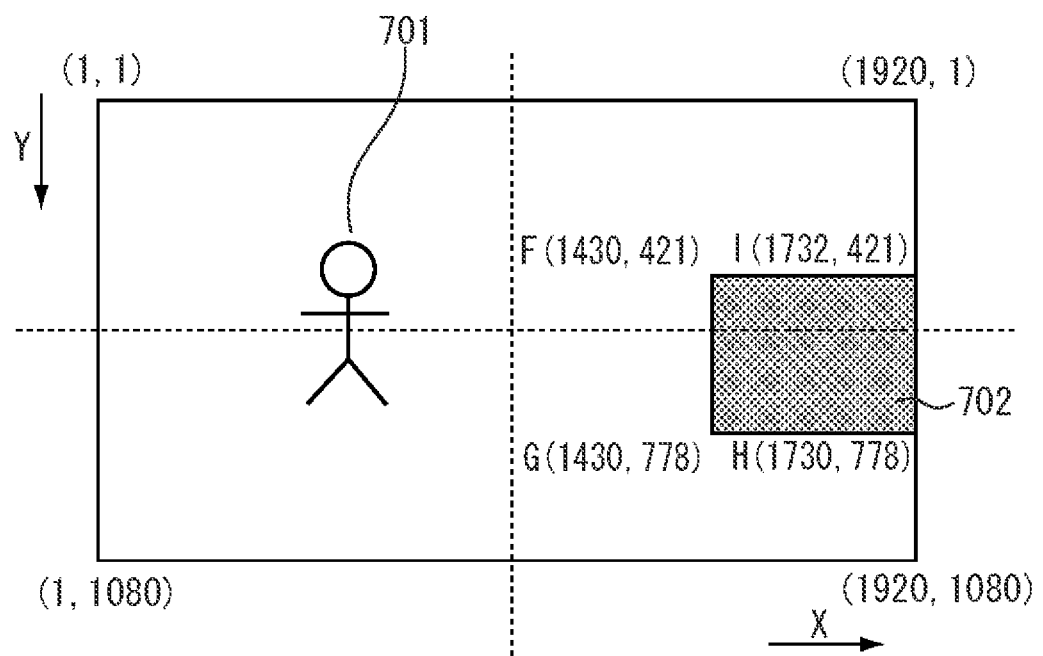
FIG. 7 illustrates an object shifted by 5° from a center to a left side of a display surface.

FIG. 7 illustrates a case where an object 701 is shifted leftward by 5° from a center of a display surface. As illustrated in FIG. 7, when the object 701 is not located on the center position of the display surface of a captured frame but shifted leftward by 5° from the center position of the display surface, a gazing point of the observer is also shifted leftward by 5° from the center of the display surface of the captured frame. When the gazing point of the observer is not located on the image center of the viewfinder unit 107, a blind spot range 702 of the observer on an image pickup device 102 changes along with a position of the gazing point.

In the first exemplary embodiment, the right end of the blind spot range 301 reaches the outside of the displayed image, and hence the blind spot range 301 in the display surface is small. However, as illustrated in FIG. 7, when the gazing point of the observer is shifted leftward by 5° in a horizontal direction from the center of the display surface, as a result of this left-shifting of the gazing point of the observer, the entire blind spot range 702 of the observer is included in the displayed image.

As described above, in this exemplary embodiment, the gazing point of the observer is shifted leftward by 5° from the center position of the image. Hence, the blind spot range 702 of the observer includes positions of 8° to 13° right in the horizontal direction from the image center when the image center position is used as a reference. Pixel positions of the displayed image can be calculated by the method described above in the first exemplary embodiment. The blind spot range 702 of the observer is a range surrounded by four points of F (1430, 421), G (1430, 778), H (1732, 778), and I (1732, 421). The observer cannot recognize a change of an image in the blind spot range 702.

Figure 8:
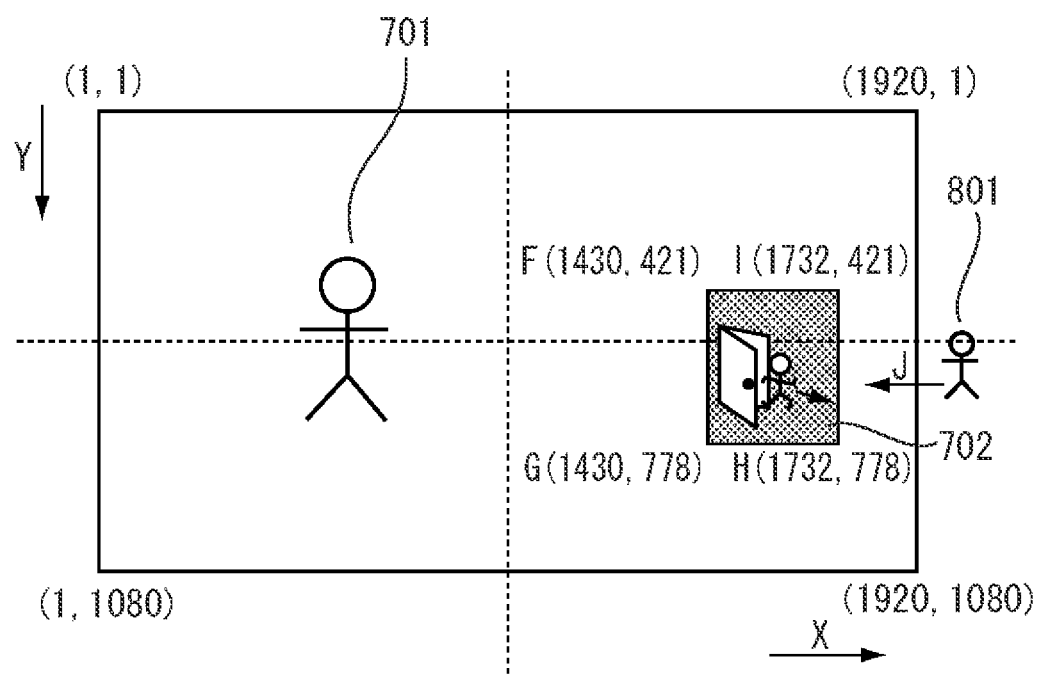
FIG. 8 illustrates a state where an object moves from the outside of a captured frame to appear on the display surface.

FIG. 8 illustrates a case where an object 801 moves from the outside of the captured frame to appear in the display surface.

As illustrated in FIG. 8, when the object 801 moves from the outside of the shooting frame in an arrow direction J in the above-described state, the object passes through a position outside the blind spot range 702 of the observer, and hence the observer can recognize appearance of the object in the captured frame. However, when there is a building entrance or the like in the blind spot range 702 of the observer, an object 802 may appear in the blind spot range 702 of the observer. However, the line-of sight detection unit 602 can be included in the viewfinder unit 107, so that the detection range is changed according to a line-of sight direction of the observer. Thus, irrespective of the gazing point of the observer, whether the object 802 has appeared in the range of a blind spot 204 of the observer can be detected.

In this exemplary embodiment, the image signal of the blind spot range 702 transmitted from the image pickup device 102 to the detection unit 109 is within the range surrounded by the points E to H. However, the blind spot range 702 varies depending on an observer. In the exemplary embodiment, an angle of view of the viewfinder unit 107 is 32°. Hence, when the observer closely observers the center of the display surface, the entire blind spot range 702 of the observer cannot be detected. In the exemplary embodiment, the observer observes the viewfinder unit 107 with the right eye, and hence the blind spot range 702 of the observer is located on the right side of the image. Thus, for the observer, a gazing point position for calibration is displayed in a center of an image left half of the viewfinder unit 107, in other words, a position of 8° left from the image center. In a state where this position is displayed to the observer, a display unit 105 displays a marker.

In this state, the observer specifies a portion where the observer cannot observe the marker while closely observing the image center by moving the marker, and determines an image signal on the image pickup device 102 to be transmitted to the detection unit 109. Thus, calibration may also be performed. By performing the calibration, the entire blind spot range 702 according to the observer can be detected, and improvement of accuracy of the blind spot range 702 of the observer can be achieved. As the image signal to be transmitted from the captured image signal processing circuit 108 to the detection unit 109, the image signal obtained by the calibration according to the blind spot range 702 of the observer is transmitted for calculation by the detection unit 109. In this way, detection according to the observer can be performed.

In the above exemplary embodiment, as an example, the observer observes the image of the viewfinder unit 107 by using the right eye. In the case of observing the image by the left eye, the blind spot range 702 of the observer is symmetrical to a horizontal center of the image. A configuration to deal with the left eye can be realized by the method described above in the first exemplary embodiment.

As descried above, even when the object 701 to be captured shifts from the center of the display surface, the observer can be notified of the appearance of the object 802 in the blind spot range 702 of the observer. Thus, the observer can know the appearance of the unintended object 802 in the shooting frame. As a result, the observer can prevent capturing of an unintended image by changing a frame to be taken or canceling an image pick-up operation.

Figure 9:
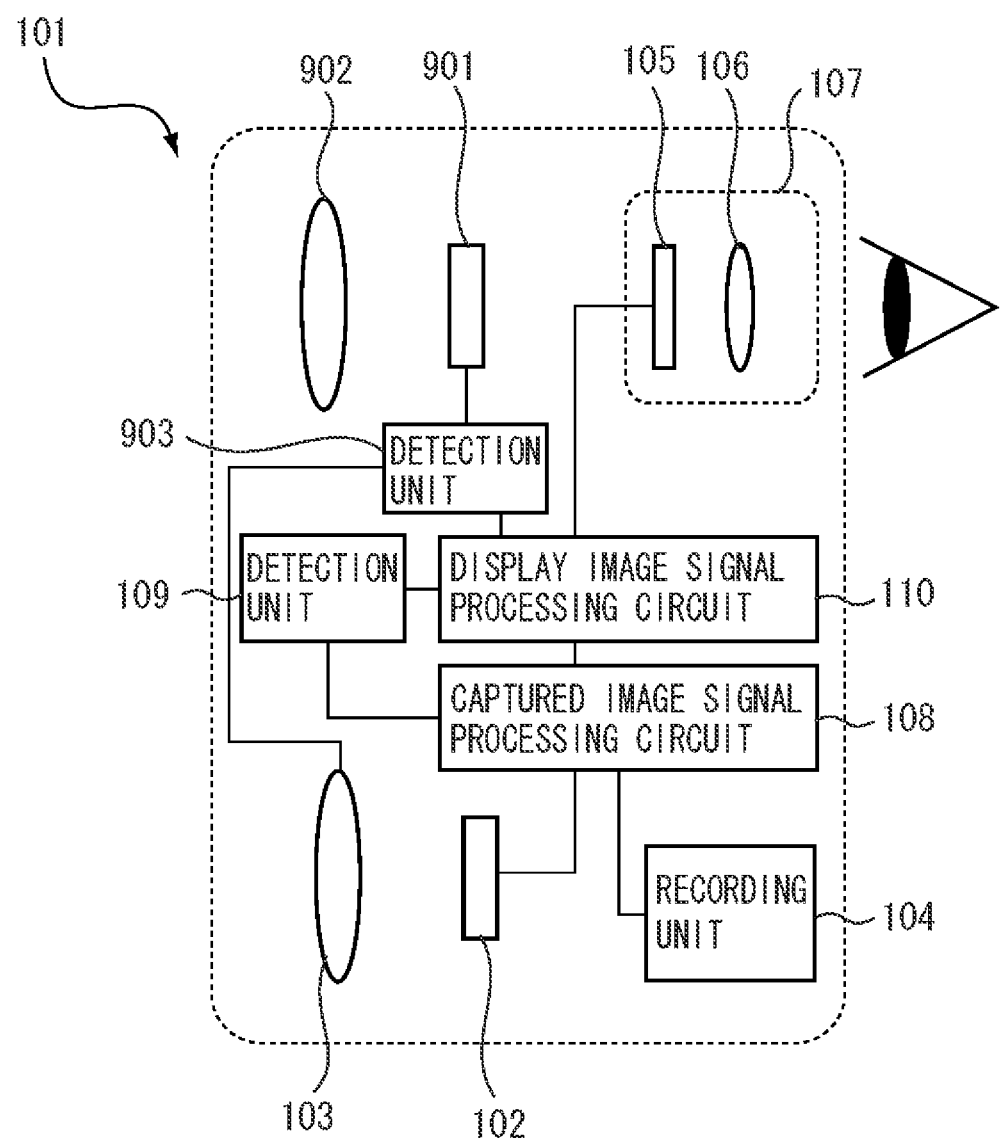
FIG. 9 illustrates a configuration of an image processing apparatus according to a third exemplary embodiment.

FIG. 9 illustrates a configuration of an image processing apparatus 101 according to a third exemplary embodiment. The configuration of the image processing apparatus 101 of this exemplary embodiment is almost similar to that of the first exemplary embodiment, and members similar to those of the first exemplary embodiments have similar reference numerals.

A difference of this exemplary embodiment from the first exemplary embodiment is that the image processing apparatus 101 includes a second image pickup device 901 different from the first image pickup device 102 for capturing an image, a second imaging lens 902, and a second detection unit 903. In this exemplary embodiment, an observer observes an image of a viewfinder unit 107 with the right eye.

The image pickup device 901 includes a charge coupled device (CCD) or a complementary metal oxide semiconductor (CMOS), and obtains an image formed on the second image pickup device 901 as digital image data. A basic configuration is similar to that of the image pickup device 102 of the first exemplary embodiment.

The second imaging lens 902 is a lens for forming an image of an object on the second image pickup device 901. A difference from the imaging lens 103 of the first exemplary embodiment is that in a range wider than an image capturing range that can be imaged on the wide end side by the zoom mechanism of the imaging lens 103, an image can be captured.

The second detection unit 903 includes a CPU and a RAM for storing a detection processing program. The detection processing program is for detecting a moving object outside a shooting frame taken by the image pickup device 102. The second detection unit 903 is connected to a display image signal processing circuit 110 so as to transmit presence of the moving image outside the shooting frame taken by the image pickup device 102 to the display image signal processing circuit 110.

Figure 10:
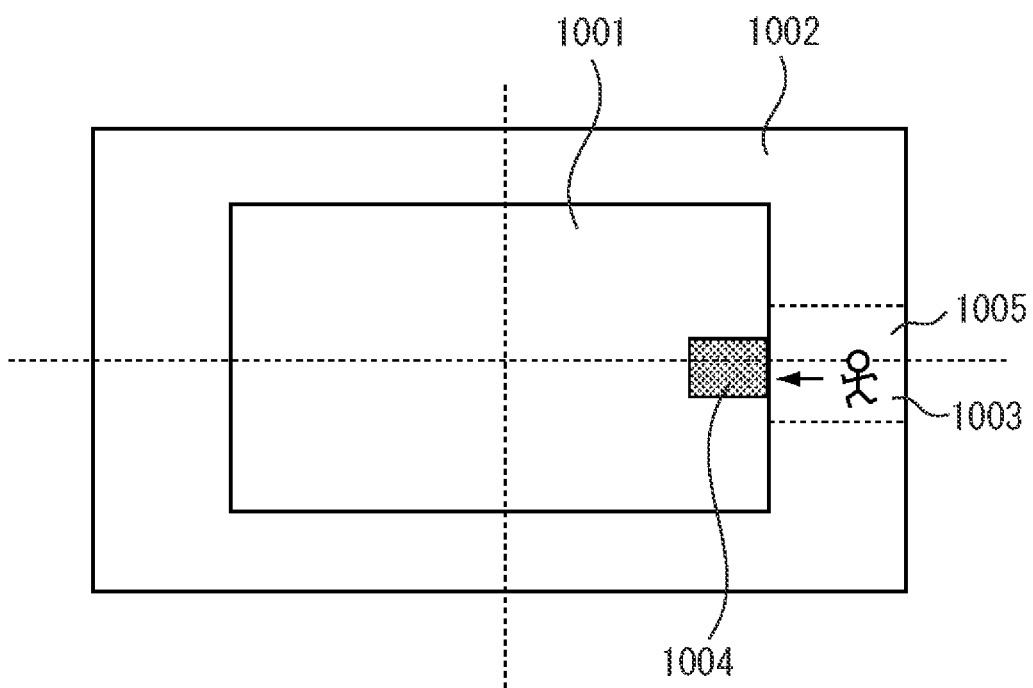
FIG. 10 illustrates functions of a second image pickup device, a second imaging lens, and a second detection unit.

FIG. 10 illustrates functions of the second image pickup device 901, the second imaging lens 902, and the second detection unit 903 in detail.

The second image pickup device 901 can capture an image in a range 1002 wider than an image capturing range 1001 to be imaged on the wide end side by the zoom mechanism of the first imaging lens 103, by the second imaging lens 902. The capturing range 1002 of the second image pickup device 901 is 1.5 times larger than the capturing range 1001 of a largest angle of view captured by the first image pickup device 102.

As described above, the observer checks the shooting frame by the viewfinder 107 in the capturing range 1001 to be imaged by the first image pickup device 102, and there is a blind spot range 1004 that becomes a blind spot 204 of the observer illustrated in FIG. 10.

In the blind spot range 1004 of the observer, whether an object has appeared is detected by the above-mentioned method. The second image pickup device 901 of this exemplary embodiment captures the object in the wide capturing range 1002. Thus, the second detection unit 903 can detect a motion vector of an object 1003 outside the capturing range 1001 captured by the first image pickup device 102.

The second detection unit 903 can detect a position of the first imaging lens 103, and extract the capturing range 1001 captured by the first image pickup device 102 within the range captured by the second image pickup device 901 when making the detection.

The capturing range 1001 of the first image pickup device 102 has a zoom magnification variable depending on a position of the first imaging lens 103. A size of the capturing range 1001 of the first image pickup device 102 is also variable in the capturing range 1002 of the second image pickup device 902.

The range for detecting the motion vector is not necessarily all the image signals of the second image pickup device 801. For example, only a detection range 1005 located outside the capturing range 1001 captured by the first image pickup device 102 and indicated by a broken line in FIG. 10 may be used. The detection range 1005 is an area twice larger in a vertical direction of the blind spot range 1004 of the observer and up to a right end of the capturing range 1002 of the second image pickup device 901 in a horizontal direction.

Since the position of the first imaging lens 103 can be detected, the second detection unit 903 can change the detection range 1005 according to a change of the detection range 1001 of the first image pickup device 102. The second detection unit 903 can detect, by detecting the motion vector of the object 1003, a possibility that the object 1003 will appear in a position which becomes the blind spot range 1004 when the observer observes the viewfinder unit 107. After detecting the possibility that the object 1003 will appear in the capturing range 1001 captured by the first image pickup device 102 based on the motion vector of the object 1003, the second detection unit 903 transmits a signal to the display image signal processing circuit 110 before the object 1003 enters the capturing range 1001 captured by the first image pickup device 102.

After receiving the signal from the second detection unit 903, the display image signal processing circuit 110 superimposes an image signal "blind spot range warning" on the right lower portion of the image received from the captured image signal processing circuit 108 to give a warning and transmits the image signal to a display unit 105. The warning message to be displayed is not limited to the above content. As described above in the first exemplary embodiment, other messages or other notification methods may be employed.

In the above exemplary embodiment, as an example, the observer observes the image of the viewfinder unit 107 by using the right eye. In the case of observing the image by the left eye, the blind spot range 1004 of the observer is symmetrical to a horizontal center of the image. A configuration for an operation with the left eye can be realized by the method described above in the first exemplary embodiment.

As described above, by notifying the observer of the appearance of the object in the blind spot range 1004 of the observer, the observer is notified of the appearance of the unintended object in the captured frame. Furthermore, by including the second image pickup device 901, the second imaging lens 902, and the second detection unit 903, the observer can be notified of the possibility that the object 1003 will appear in the blind spot range 1004 of the observer before the object 1003 appears in the capturing range 1001 of the first image pickup device 102.

As a result, the observer can prevent capturing of an unintended image by changing a frame to be taken or canceling an image pick-up operation.

Figure 11:
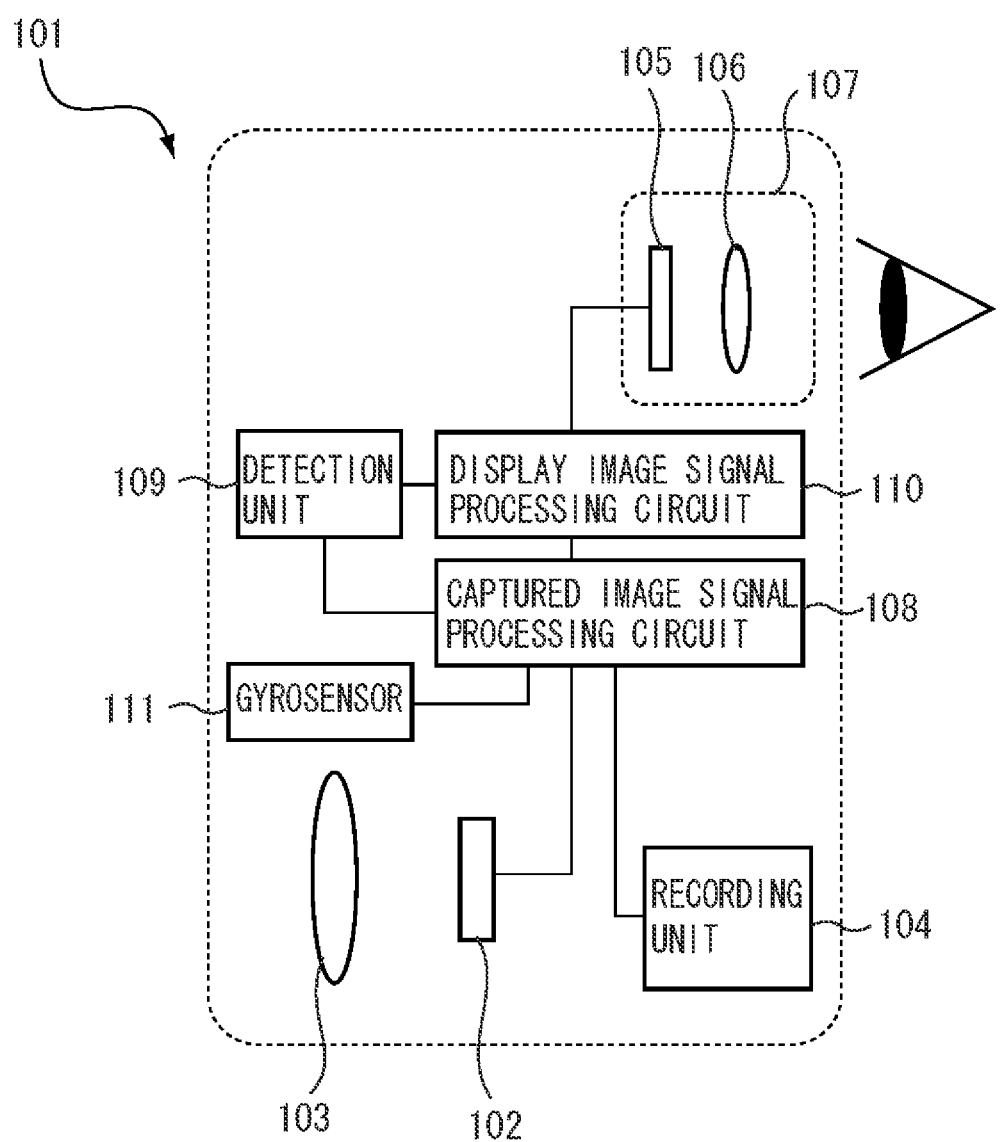
FIG. 11 illustrates a configuration of an image processing apparatus according to a fourth exemplary embodiment.

FIG. 11 illustrates a configuration of an image processing apparatus 101 according to a fourth exemplary embodiment.

The configuration of the image processing apparatus 101 of this exemplary embodiment is almost similar to that of the first exemplary embodiment, and members similar to those of the first exemplary embodiments have similar reference numerals.

A difference of this exemplary embodiment from the first exemplary embodiment is that a gyrosensor 111 configured to detect an orientation of the image processing apparatus 101 used by an observer is provided. The gyrosensor 111 detects an orientation of the image processing apparatus 101. A captured image signal processing circuit 108 switches a range of an image signal transmitted to a detection unit 109 according to the orientation of the image processing apparatus 101. In this exemplary embodiment, the observer observes an image of a viewfinder unit 107 with the right eye.

An image pickup device 102 of this exemplary embodiment will be described. The image pickup device 102 has a total of about 21.1 million pixels consisting of 5616 pixels in a horizontal direction and 3744 pixels in a vertical direction. However, the number of pixels used for the image pickup device 102 is not limited to resolution of the image pickup device 102 of the exemplary embodiment: an image pickup device of lower resolution or a high-definition image pickup device may be used. The image pickup device 102 of the exemplary embodiment includes a CCD or a CMOS.

Next, the viewfinder unit 107 will be described. For a display unit 105 used in this exemplary embodiment, any type of a display device may be used as long as the display unit enables the observer to check an image on the image pickup device 102 as described above in the first exemplary embodiment. The number of pixels for the display unit 105 of the exemplary embodiment consists of 1200 pixels in the horizontal direction and 800 pixels in the vertical direction. Not all the number of pixels of the image pickup device 102 is displayed but images of the image pickup device 102 are thinned and displayed.

The observer observes an image of the display device 105 through an eyepiece 106. In this exemplary embodiment, the viewfinder 107 has a horizontal angle of view set to 36°, an aspect ratio set to 3:2, and a vertical angle of view set to 24°.

Figure 12:
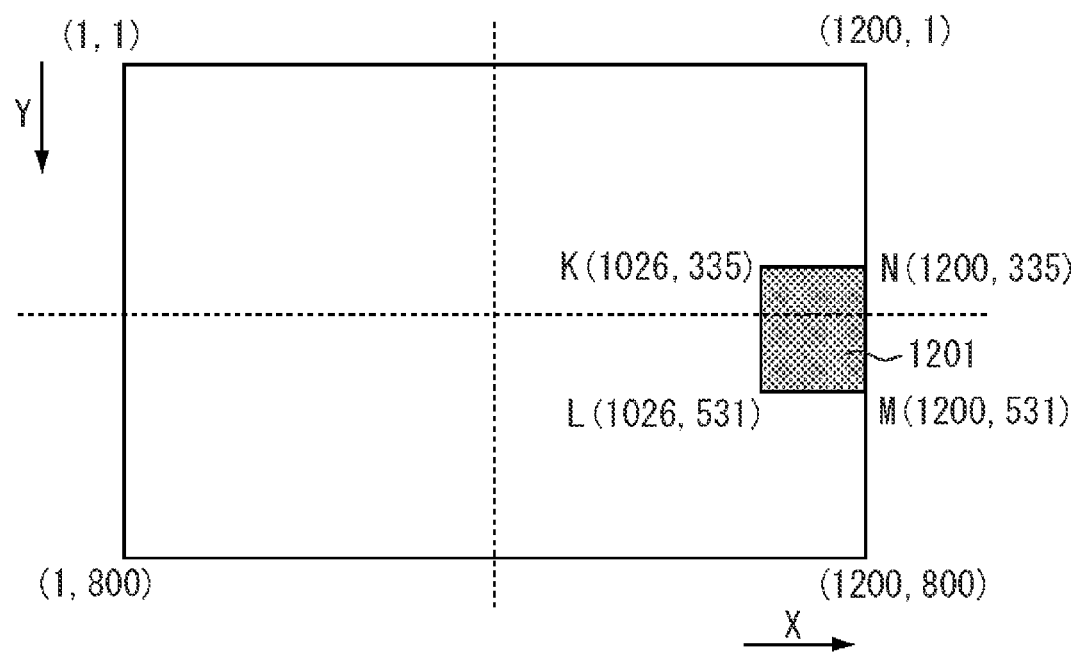
FIG. 12 illustrates a positional relationship between an image configuration and a blind spot of an observer on a display surface of a display device.

FIG. 12 illustrates a positional relationship between an image configuration of a display surface of the display device 105 and a blind spot 204 of the observer.

FIG. 12 illustrates the positional relationship between the image configuration of the display device 105 and the blind spot 204 of the observer illustrated in FIG. 2. As illustrated in FIG. 12, a horizontal direction of the display device 105 is set as an X direction, a vertical direction is set as a Y direction, pixels on the left upper corner are set as (1, 1), and pixels on the right lower corner are set as (1200, 800). When the observer sets a shooting object in an image center, the observer gazes at the image center, and the image center forms an image on a fovea centralis 203 on a retina 202.

In this exemplary embodiment, a horizontal angle of view from the left end to the right end of the viewfinder unit 107 is 32°, and hence an angle of view is 18° in a right half of the screen from the image center. A position of the blind spot 204 is 13° to 18° right in the horizontal direction from the image center, and hence the position is from the position of 13° right in the horizontal direction to the right end of the image on the image of the viewfinder unit 107. The position of 13° right in the horizontal direction from the image center that becomes a position of the blind spot 204 can be represented by the following expression (2):

$$\frac{\tan 13}{\tan 18} \times 600 + 600 = 1026 \tag{2}$$

In the pixels illustrated in FIG. 12, the position of the pixel is the 1026-th. The position is 2° upward and 4° downward in a vertical direction. Hence, when the similar calculation is performed, for a pixel position corresponding to the blind spot 204 of the observer, pixels within a range surrounded with four points of K (1026, 335), L (1026, 531), M (1200, 531), and N (1200, 335) constitute a blind spot range 1201 of the observer. In the blind spot range 1201, the observer cannot recognize an occurring event. An image signal from the image pickup device 102 corresponding to the blind spot range 1201 is transmitted from the captured image signal processing circuit 108 to the detection unit 109, and appearance of an object in the blind spot range 1201 of the observer can be detected by the method described above in the first exemplary embodiment.

Figure 13:
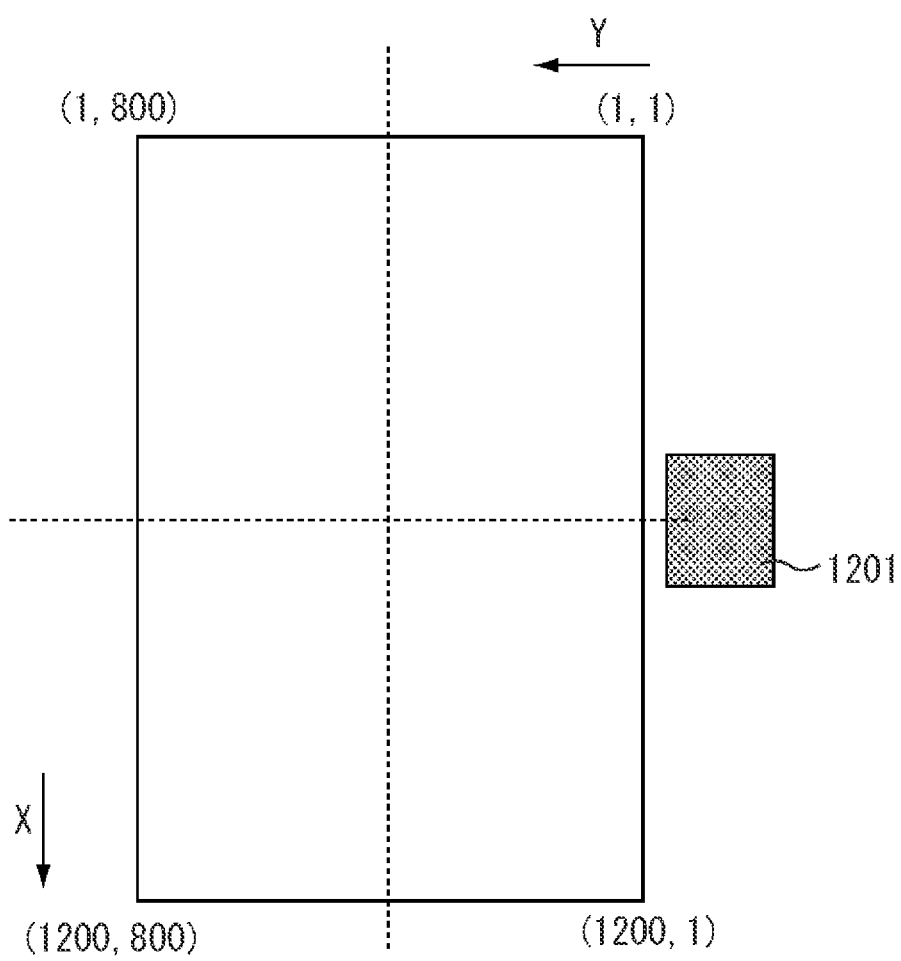
FIG. 13 illustrates the image on the display surface when the image processing apparatus is rotated by 90° around a line-of sight direction of the observer.

FIG. 13 illustrates an image of a display surface when the image processing apparatus 101 is rotated by 90° around a line-of sight direction of the observer to be used.

When the image processing apparatus 101 is compact enough to be carried by the observer, the image processing apparatus 101 may be rotated by 90°. In this case, an image observed through the viewfinder unit 107 is as illustrated in FIG. 13. When the observer uses the image processing apparatus 101 in this state, an angle of view in a Y direction of FIG. 13 that is a horizontal direction to the observer is 24°. Hence, the blind spot range 1201 of the observer is not included in the observed image.

The image processing apparatus 101 of this exemplary embodiment includes the gyrosensor 111. When the image processing apparatus 101 is used vertically, an oriented state of the gyrosensor 111 is transmitted to the captured image signal processing circuit 108. When notified of the vertical use of the image processing apparatus 101 by the gyrosensor 111, the captured image signal processing circuit 108 does not transmit an image signal to the detection unit 109, thereby preventing erroneous detection of the detection unit 109.

In this exemplary embodiment, the horizontal angle of view of the viewfinder unit 107 is 36°. However, if a horizontal angle of view of the viewfinder unit 107 is set to 40° or higher in a case where the aspect ratio is 3:2, when the image processing apparatus 101 is vertically used, the blind spot range 1201 of the observer is included in the observed image. When the horizontal angle of view of the viewfinder unit 107 is set as above, the captured image signal processing circuit 108 stores a detection range for a case where the image processing apparatus 101 is horizontally used, and a detection range for a case where the image processing apparatus 101 is vertically used.

The gyrosensor 111 detects an orientation of the image processing apparatus 101, and a detection range of an image signal transmitted from the captured image signal processing circuit 108 to the detection unit 109 can be switched according to the detected orientation. By the aforementioned method, even when the image processing apparatus 101 is vertically used, appearance of an object in the blind spot range 1201 of the observer can be detected.

In the above exemplary embodiment, as an example, the observer observes the image of the viewfinder unit 107 by using the right eye. In the case of observing the image with the left eye, the blind spot range 1201 of the observer is symmetrical to a horizontal center of the image. A configuration for an operation with the left eye can be realized by the method described above in the first exemplary embodiment.

The method described above in the first exemplary embodiment enables accurate calibration of the blind spot range 1201 of the observer. The calibrated blind spot range 1201 of the observer can be reflected on the detection range of the orientation of the image processing apparatus 101.

Further, the image processing apparatus 101 may include the line-of sight detection unit described above in the second exemplary embodiment, thereby enabling changing of the detection range according to a line-of sight direction of the observer.

When capturing an object, appearance of the object in a frame may not be cared. In this case, if a warning is issued each time an object appears in the blind spot range 1201 of the observer, the observer may feel disturbed. Thus, the image processing apparatus 101 may include a switch configured to stop the function of the present invention. Further, the function of the present invention may be operated only when the image processing apparatus 101 is in focus.

As descried above, the observer is notified of the appearance of the object in the blind spot range 1201 of the observer. Thus, the observer can know the appearance of the unintended object in the shooting frame. By changing the range for detecting the object based on the orientation of the image processing apparatus 101, erroneous detection due to a used state can be eliminated. As a result, the observer can prevent capturing of an unintended image by changing a frame to be taken or canceling an image pick-up operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-010991 filed Jan. 21, 2009, which is hereby incorporated by reference herein in its entirety.

What is claimed is:

1. An apparatus comprising:
an image generation unit configured to generate a plurality of images displayed in a display area;
a setting unit configured to set a blind spot area in the display area of a view finder based on a position of a blind spot that a retina does not exist in an eyeball of an observer;
a detection unit configured to detect a change of an image in the blind spot area based on the plurality of images; and
a notification unit configured to notify the observer of the change of the image in the blind spot in case where the change of the image in the blind spot area is detected by the detected.

2. The apparatus according to claim 1, further comprising an obtaining unit configured to obtain information about a difference of a blind spot of the observer.

3. The apparatus according to claim 2, wherein the setting unit sets the blind spot area based on the obtained information and the blind spot position of the observer.

4. The apparatus according to claim 1, further comprising a correction unit configured to replace, in case that the detection unit detects the change of the image in the blind spot area, the image that the change is detected in the blind spot area with the image that the change is not detected in the blind spot area.

5. The apparatus according to claim 1, wherein:
the image displayed within the display area is an image captured by an image capture unit; and
the setting unit sets the blind spot area based on an orientation of the image capture unit and the blind spot position of the observer.

6. The apparatus according to claim 1, further comprising a line-of sight direction detection unit configured to detect a line-of sight direction of the observer.

7. The apparatus according to claim 6,
wherein the setting unit sets the blind spot area based on the line-of sight direction and the blind spot position of the observer.

8. The apparatus according to claim 1, further comprising an orientation detection unit configured to detect an orientation of the observer.

9. The apparatus according to claim 8,
wherein the setting unit sets the blind spot area based on the orientation of the observer and the blind spot position of the observer.

10. An apparatus comprising:
a display unit configured to display an image captured by an image capture unit;
a viewfinder configured to present the displayed image to an observer via an optical member;
an image generation unit configured to generate a plurality of images displayed in a display area;
a setting unit configured to set, based on a position of a blind spot that a retina does not exist in an eyeball of the observer, a blind spot area in the display area;
a detection unit configured to detect a change of an image in the blind spot area based on the plurality of images; and
a notification unit configured to notify the observer of the change of the image in the blind spot area in case where the change of the image in the blind spot area is detected by the detected unit.

11. A method comprising:
generating a plurality of images displayed in a display area;
setting a blind spot area in the display area of a view finder based on a position of a blind spot that a retina does not exist in an eyeball of an observer;
detecting a change of an image in the blind spot area based on the plurality of images; and
notifying, in case where the change of the image in the blind spot area is detected by the detecting, the observer of the change of the image in the blind spot area.

12. The method according to claim 11, further comprising:
obtaining information about a difference of a blind spot of the observer.

13. The method according to claim 11, further comprising:
replacing, in case that the detecting detects the change of the image in the blind spot area, the image that the change is detected in the blind spot area with the image that the change is not detected in the blind spot area.

14. A non-transitory computer medium storing a computer program for causing a computer to function as an image processing apparatus for displaying an image to an observer, the image processing apparatus including:
an image generation unit configured to generate a plurality of images displayed in a display area;
a setting unit configured to set a blind spot area in the display area of a view finder based on a position of a blind spot that a retina does not exist in an eyeball of the observer;
a detection unit configured to detect a change of an image in the blind spot area based on the plurality of images; and
a notification unit configured to notify the observer of the change of the image in the blind spot in case where the change of the image in the blind spot area is detected by the detected unit.

15. A non-transitory computer readable storage medium storing a computer-executable program of instructions for causing a computer to perform a method comprising:
generating a plurality of images displayed in a display area;
setting a blind spot area in the display area of a view finder based on a position of a blind spot that a retina does not exist in an eyeball of an observer;
detecting a change of an image in the blind spot area based on the plurality of images; and
notifying the observer of the change of the image in the blind spot in case where the change of the image in the blind spot area is detected by the detecting.

16. The non-transitory computer readable storage medium according to claim 15, further comprising:
obtaining information about a difference of a blind spot of the observer.

* * * * *